Nov. 17, 1931.  N. J. HARVEY ET AL  1,831,859
DEFROSTING WINDSHIELD WIPER
Filed March 10, 1930   2 Sheets-Sheet 1
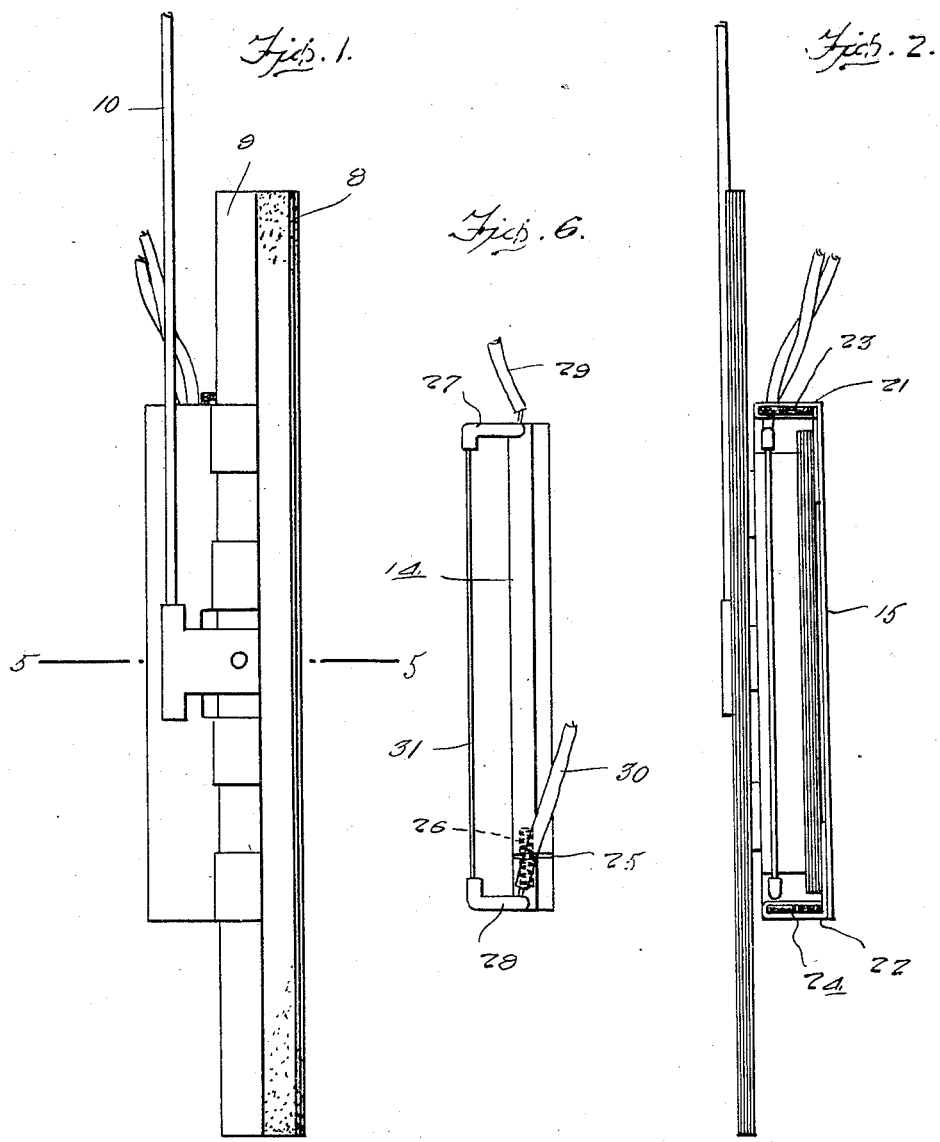
Inventor
Norman J. Harvey
Ray Porter
By Clarence A O'Brien
Attorney Nov. 17, 1931.  N. J. HARVEY ET AL  1,831,859
DEFROSTING WINDSHIELD WIPER
Filed March 10, 1930    2 Sheets-Sheet 2
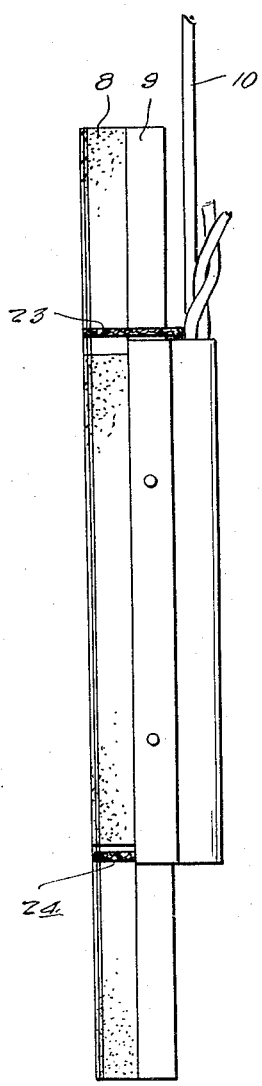
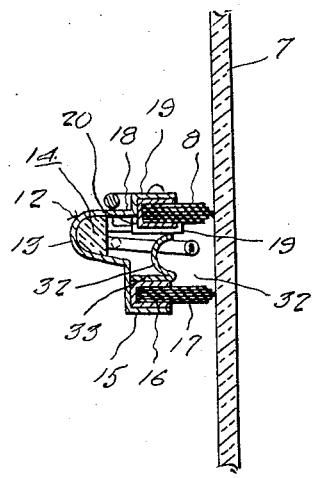
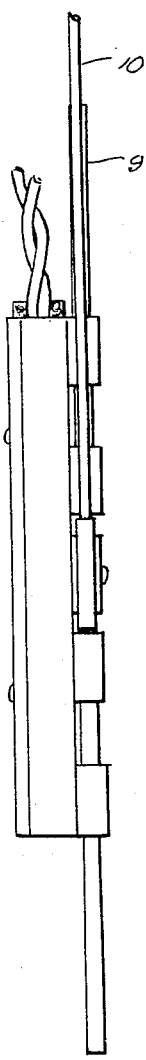
Inventor
Norman J. Harvey
Ray Porter.
By Clarence A. O'Brien
Attorney Patented Nov. 17, 1931

1,831,859

UNITED STATES PATENT OFFICE

NORMAN J. HARVEY AND RAY PORTER, OF PLATTE CENTER, NEBRASKA

DEFROSTING WINDSHIELD WIPER

Application filed March 10, 1930. Serial No. 434,750.

This invention relates to de-frosting windshield wipers, and an object of the invention is to provide an attachable casing for the conventional windshield wiper in which is mounted an electrical heating filament that melts the snow and ice in the path of the wiper, so as to provide clear vision of the operator of the automobile.

Another feature of the invention is to provide an electrical responsive filament that glows before the eyes of the operator so that it will visibly inform him to turn the heater off before leaving the automobile, so that the same will not run the battery down.

Further objects of the invention are to provide an attachment of the character referred to that is strong, compact and durable, thoroughly reliable for its intended purpose, adaptable for attachment to all standard windshield wipers, that is very simple in its method of assembly, and that is comparatively inexpensive to manufacture and operate.

With the foregoing and other objects in view, the invention consists of a novel construction, combination and arrangement of parts, as will be hereinafter more specifically described and illustrated.

In the accompanying drawings, wherein is disclosed an embodiment of the invention, but it is to be understood that changes, variations and modifications may be resorted to without departing from the spirit of the claims hereto appended.

In the drawings wherein like reference characters denote corresponding parts throughout the several views:—

Figure 1 is one side elevation of a windshield wiper showing the attachment mounted thereon, Fig. 2 is a view looking into the rear part of the device, Fig. 3 is a side elevation opposed to that shown in Fig. 1 of the drawings, Fig. 4 is a front view thereof, Fig. 5 is a detailed section taken substantially on the line 5—5 of Fig. 1, and Fig. 6 is a perspective view of the filament and insulating rod removed from the same.

Referring to the drawings in detail, 7 indicates generally a windshield glass of an ordinary automobile, that is frictionally engaged by the rubber wiper 8 of a conventional windshield wiper.

The rubber wiper 8 as is customary, is mounted in a channel bar 9 and this channel bar 9 is swingably mounted on an arm 10 that is operated in any suitable manner so as to swing the wiper across the windshield glass.

The device in accordance with the present invention consists of an elongated rectangular casing indicated generally at 12. The outer or front wall 13 is formed with a bow and anchored in this bow is a block of insulating material 14 that extends throughout the entire length of the casing.

The side wall 15 is formed with a channel 16 throughout its entire length, and seated within this channel 16 is the rubber wiping fabric 17, which has a wiping contact with the windshield glass.

The other side wall 18 of the casing adjacent its rear edge, is slitted inwardly from its rear edge at spaced intervals to provide gripping prongs 19 at intervals along this side. Alternate prongs 19 are bent outwardly while the intermediate prongs 19 are bent inwardly so as to provide a channel 20 between the prongs.

Frictionally seated in this channel is the channel 9 of the windshield wiper, and said channel 9 is held in this position by the prongs that overlap the channel. It will thus be seen that the oppositely disposed prongs 19 grip the channel 9 of the windshield wiper, and provide a support for the casing 12.

In view of the foregoing, it will be seen that there is a closed longitudinal compartment between the wipers 17 and 8. Secured to the opposite ends of the casing 12 are the channeled end walls 21, 22 and anchored in the channels of the end walls are layers of felt 23, 24 that also bear against the windshield glass to close the ends of the casing.

The channeled end walls terminate slightly outwardly from the glass so that the metal thereof will not come in contact with the glass, but the felt will contact with the glass, thereby overcoming the possibility of the metal breaking the glass.

Adjacent one end, the insulating bar 14 is split as at 25 and the confronting ends of the bar adjacent the split are provided with sockets in which is seated a continuous coil spring 26 to allow for contraction and expansion of the filament to be presently described.

Anchored in the ends of the insulating bar 14 are electrical conducting posts 27, 28 and an electrical conducting wire 29 is connected with post 27 while electrical conducting wire 30 is connected with post 28 and leads to a rheostat on the instrument board of an automobile, so that the heat in the filament may be regulated.

It will of course, be understood that the posts 27 and 28 are covered with rubber for a portion of their length where there is liable to be a contact with the metal parts of the casing. Between the two posts 27 and 28, there extends an electrically responsive filament 31 which is formed of any suitable metal.

The filament 31 is spaced in the interior of the casing and is also spaced about one-eighth of an inch from the windshield glass.

An arcuate reflector is disposed forwardly of the filament and extends throughout the entire length of the casing. The reflector 32 is formed with an extension 33 along one edge and this extension is soldered or otherwise secured to one leg of the channeled outer wall 15.

From the foregoing it will be seen that when current is supplied to the filament 31, heat will be reflected to the windshield glass, whereby ice and snow will be melted from both the inside and the outside of the glass. Furthermore, by having the outer wall of the casing with a portion of its width formed with a rubber wiper, there will be a double wiper that removes any melted ice and snow. Furthermore, the interior of the casing is closed on its four sides so as to provide a closed compartment.

It will also be noted that there is no danger of cracking the windshield glass, inasmuch as the heating device moves with the oscillation of the windshield wiper.

The present embodiment of the invention has been disclosed in considerable detail merely for the purpose of exemplification, since in actual practice, it attains the features of advantage enumerated as desirable in the statement of the invention, and the above description.

It is to be understood that by describing in detail herein any particular form, structure, or arrangement, it is not intended to limit the invention beyond the terms of the several claims.

Having thus described our invention, what we claim as new is:—

1. A heater attachment for a windshield wiper which includes a rigid channel and a flexible strip supported in said channel and adapted to slidably abut a windshield glass, said attachment comprising an elongated casing open at its rear, clamping means on one side wall of the casing to engage the rigid channel on the windshield wiper, and the other side wall of the casing having a channel therein, a wiper strip in said channel which forms with the first strip a chamber, and an electric heating element in said chamber and supported by the casing.

2. A heater attachment for a windshield wiper which includes a rigid channel and a flexible strip supported in said channel and adapted to slidably abut a windshield glass, said attachment comprising an elongated casing open at its rear, clamping means on one side wall of the casing for engaging the rigid channel of the windshield wiper, and the other side wall of the casing having a channel therein, a wiper strip in said channel which parallels the first strip and is spaced therefrom, a channel part at each end of the casing, a flexible strip in each of said channel parts, and an electric heating element in the casing, the heat from which is retained by the side and end strips.

3. A heater attachment for a windshield wiper which includes a rigid channel and a flexible strip supported in said channel and adapted to slidably abut a windshield glass, said attachment comprising an elongated casing open at its rear, means for detachably connecting one side wall of the casing to the rigid channel, the other side wall of the casing having a channel therein, a wiper strip in said channel which parallels the first strip and is spaced therefrom, channel parts at the ends of the casing, a flexible strip in each of said parts, and electric heating elements in the casing, the heat from which is confined by the strips, and a reflector connected to said other side wall and located in front of the element for reflecting the heat from said element onto the windshield.

In testimony whereof we affix our signatures.

NORMAN J. HARVEY.
RAY PORTER.